W. E. Lockwood.
Collar & Cuff.

No. 1982. Reissued June 6. 1865

Witnesses:

Henry Houston

G. E. Houston

Inventor:

William E. Lockwood

UNITED STATES PATENT OFFICE.

WILLIAM E. LOCKWOOD, OF PHILADELPHIA, PENNSYLVANIA.

IMPROVEMENT IN LADIES' COLLARS AND CUFFS.

Specification forming part of Letters Patent No. 23,771, dated April 26, 1859; Reissue No. 1,982, dated June 6, 1865.

DIVISION D.

*To all whom it may concern:*

Be it known that I, WILLIAM E. LOCKWOOD, of Philadelphia, Pennsylvania, did obtain Letters Patent of the United States, dated April 26, 1859, for an Improvement in Collars and Cuffs and other Articles of Wearing-Apparel; that I deem the said patent inoperative and invalid by reason of a defective and insufficient specification, and that I declare the following to be a full, clear, and exact description of that part of the said invention which consists of an ornamental collar or cuff made of a fabric composed of paper and muslin, or of an equivalent fabric, ornamented by perforations.

In producing my new manufacture I use a fabric composed of paper and muslin, or an equivalent fabric having a smooth and polished surface, to represent that of starched linen. I cut from the fabric pieces of the size and shape of the desired collar or cuff or other article of wearing-apparel, and cut or punch round or other shaped holes in the same at such intervals and in such relation to each other that they may impart to the collar or cuff an ornamental appearance.

Figure 1:
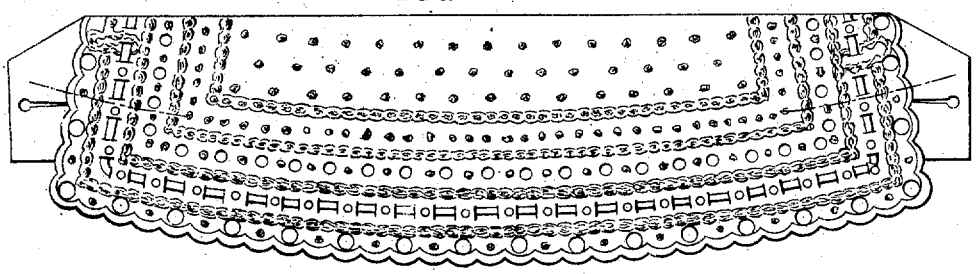
Figure 2:
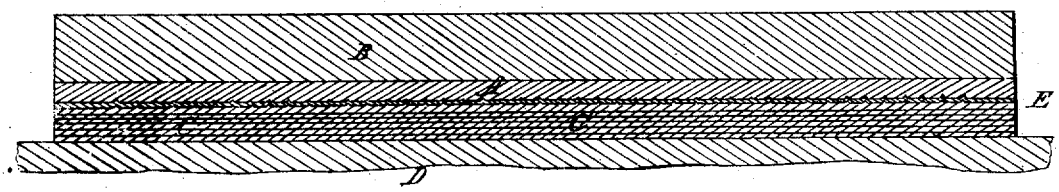

In the accompanying drawings, Figure 1 represents an embossed collar, in which a number of round holes are punched, but it will be evident that a plain collar may be thus ornamented. Fig. 2 of the drawings represents a sectional view of the dies by means of which a collar or cuff may be embossed; but as these dies have no relation to this part of my invention it will be unnecessary to describe them here.

It will be evident that the invention is applicable to shirt-bosoms, &c.

I claim as my invention and desire to secure by Letters Patent as a new article of manufacture—

An ornamental collar or cuff made of a fabric composed of paper and muslin, or an equivalent fabric ornamented by perforations, as set forth.

In testimony whereof I have signed my name to this specification before two subscribing witnesses.

WILLIAM E. LOCKWOOD.

Witnesses:

HENRY HOWSON,
JOHN WHITE.